Sept. 22, 1970    R. R. BURGESS ET AL    3,529,342
APPARATUS FOR JOINING WIRES

Filed March 11, 1968    7 Sheets-Sheet 1

REGINALD R. BURGESS,
JOHN P. HARDING,
LEONARD M. PUSEY,
ALFRED E. WALKER,
INVENTORS

BY Hall, Houghton
ATTORNEY

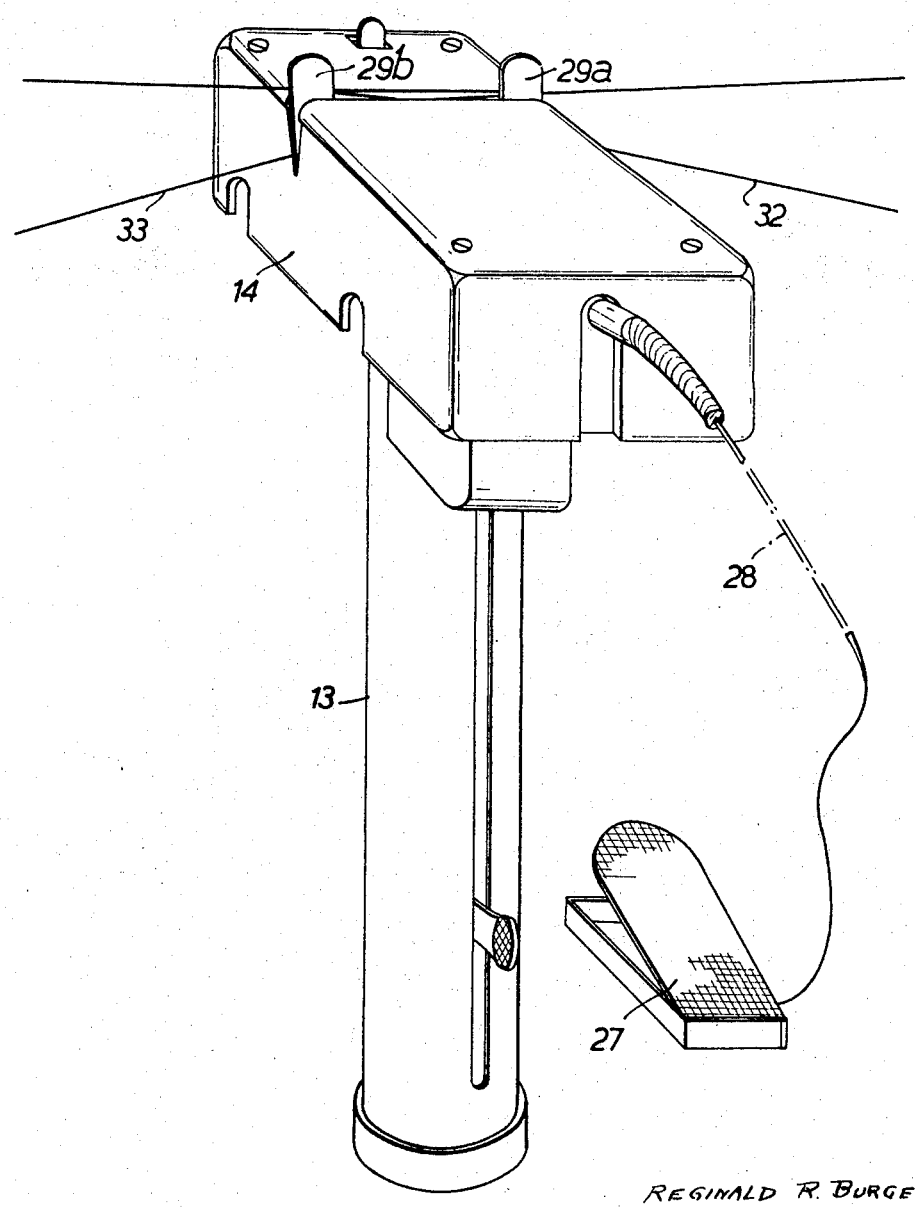

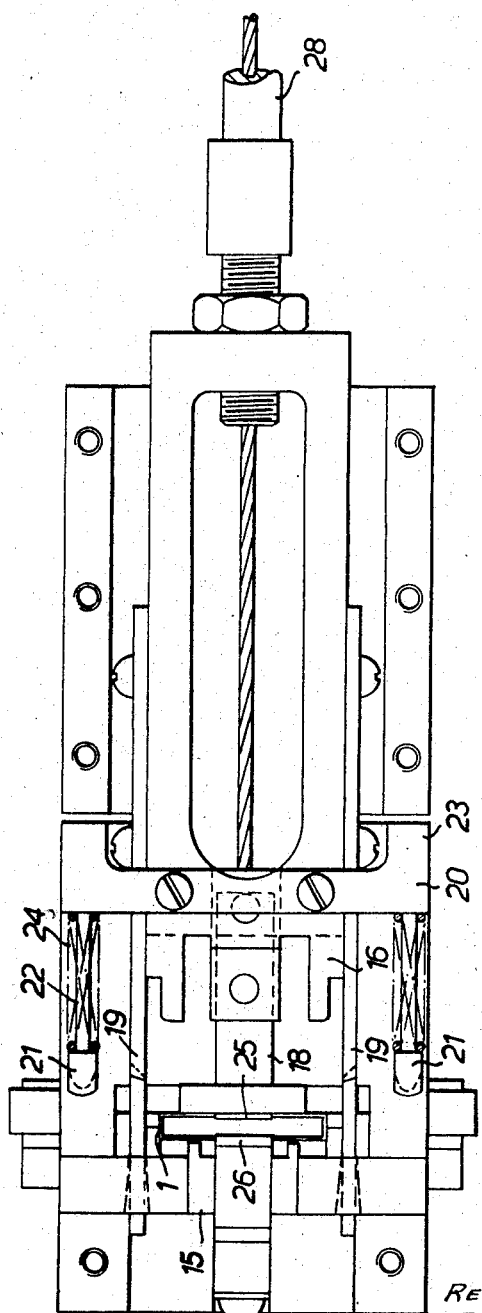

REGINALD R. BURGESS,
JOHN P. HARDING,
LEONARD M. PUSEY,
ALFRED E. WALKER,
INVENTORS

BY Hall & Houghton
ATTORNEY

REGINALD R. BURGESS,
JOHN P. HARDING,
LEONARD M. PUSEY,
ALFRED E. WALKER.
INVENTORS

United States Patent Office 3,529,342
Patented Sept. 22, 1970

3,529,342
APPARATUS FOR JOINING WIRES
Reginald Robert Burgess, London, John Patrick Harding, Bushey, Leonard Montague Pusey, Twickenham, and Alfred Edgar Walker, London, England, assignors to Her Majesty's Postmaster General, London, England
Filed Mar. 11, 1968, Ser. No. 716,264
Claims priority, application Great Britain, Mar. 22, 1967, 13,600/67
Int. Cl. H01r 43/04; B23g 7/10
U.S. Cl. 29—203         12 Claims

ABSTRACT OF THE DISCLOSURE

Machine for joining together the individual insulated wires of first and second cables to form a neat, compact and permanent electrical joint therebetween, said machine utlizing trough-shaped metallic crimping clips each having a plurality of integral tangs and deformable by the machine about the wires to be joined, the tangs piercing the insulation of the wires and making electrical contact with the wires.

---

This invention relates to apparatus for joining conductors and more particularly to the joining together of individual and corresponding wires of first and second cables by means of metallic crimping clips.

In the past, the separate wires of, for instance, telephone cables to which this invention is particularly directed, have been joined manually by twisting the wires together and covering the twisted joint with an insulating sleeve. This manual process of joining together first and second insulated wires includes the steps of threading an insulating sleeve over the first wire, bringing the two wires together and giving them a single twist to secure them and trap the insulating sleeve in the first wire, stripping the insulation from the free ends of the wires immediately adjacent the twist, forming a crank-handle in the bared wires about 2" from the initial twist and using this to impart about 12 twists in the wires emerging from the initial twist, cutting off the end of the twist to leave about 1" of twist, bending this 1" of twisted wires parallel to the lengths of wire, and moving the insulating sleeve along to enclose the twisted joint. It can be seen that this is a tedious and lengthly operation, taking about 25 seconds in skilled hands.

Machines for carrying out this jointing operation have recently been proposed but these have not been found to be significantly faster than an experienced jointer.

Consequently it is an object of the invention to provide a machine which allows faster joining of wires than by the manual method and which provide improved joints both electrically and mechanically, the final joint containing the necessary amount of stored energy to provide permanence of the electrical and mechanical connection despite temperature changes or creep or cold flow in the conductor or the insulant, and being capable of slight elastic movement under pressure.

A machine for joining together first and second lengths of insulated wire to make electrical connection between the wires, said electrical connection being achieved by means of a metallic crimping clip of trough-like form provided with integral insulation piercing means such that, on deformation of the clip, the means pierce the insulation and make electrical contact with the wire inside the insulation, includes a crimping head operable to effect deformation of the clip, and severing means arranged to cut off the free ends of the first and second wires adjacent the ends of the crimping clip after the first and second wires have been placed into and along the length of the clip in such manner that the free end of the first wire extends beyond one end of the clip and the free end of the second wire extends beyond the other end of the clip.

The machine may include wire withdrawal means arranged to pull the cut ends of the wires within the clip prior to deformation of the clip.

Preferably the wire withdrawal means are arranged to apply tension to the first and second lengths of wire prior to the cutting off of the free ends of the wires, the subsequent cutting off of the said free ends of the wires resulting in the cut ends of the first and second wires being pulled into the clip.

The machine may be provided with two vertically disposed separators arranged one on each side of the head to facilitate the placing of the first and second lengths of wire within the head of the machine.

The crimping head of the machine may contain crimping jaws arranged to cause deformation of the metallic crimping clip when the clip is in the operating position in the head of the machine.

In one embodiment of the invention the crimping jaws of the machine may comprise a punch and co-operating die.

In a further embodiment, the crimping jaws may comprise first and second members each pivotally mounted about a horizontal axis, the first member being arranged to cause deformation of one arm of the clip about one of the wires to make electrical contact therewith, while the second member causes deformation of the other arm of the clip about the other wire to make electrical contact therewith.

The above embodiment may include a movable member adapted to carry a clip in the operating position, the member being movable during the crimping operation, to cooperate with the crimping jaws and cause deformation of the clip about the first and second wires.

The machine may be provided with a spring-loaded magazine arranged to contain a plurality of metallic crimping clips and providing a continual feed of clips to the head of the machine. Each clip in the magazine may be in adhesive relationship with the neighbouring clip or clips, the machine having separating means arranged to separate, prior to the crimping action, a clip in the operating position from the next following clip.

Prior to deformation of the clip, the clip may be held in the operating position by restraining means, at least part of which is arranged to retract during the crimping action to allow withdrawal of the deformed clip.

Preferably the machine is foot-operated.

By way of example only, machines for joining wires using metallic crimping clips will now be described with reference to the accompanying drawings of which:

FIG. 7 is a perspective view of a first machine,

FIG. 7a is a plan view of the head of the machine of FIG. 7,

FIG. 7b is a vertical section through the machine of FIG. 7,

Figures 15, 76:
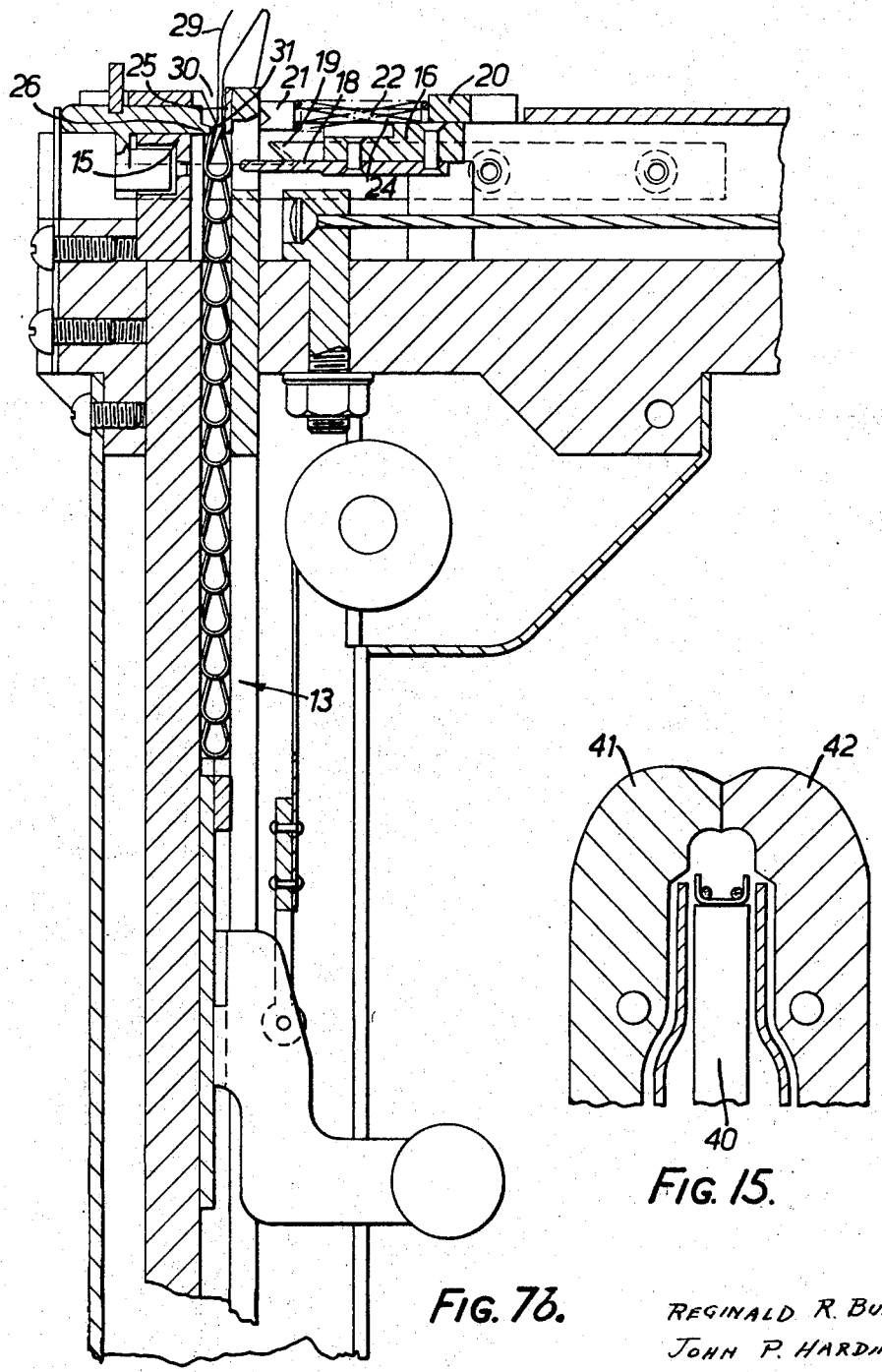
Figure 8:
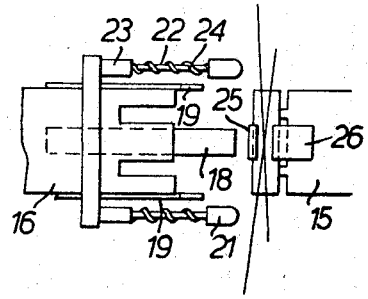
Figure 8A:
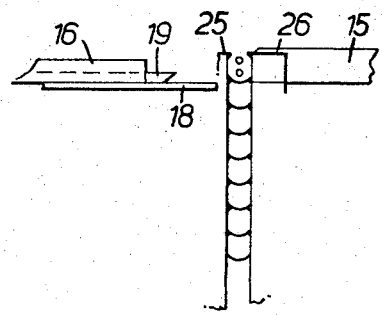
Figure 9:
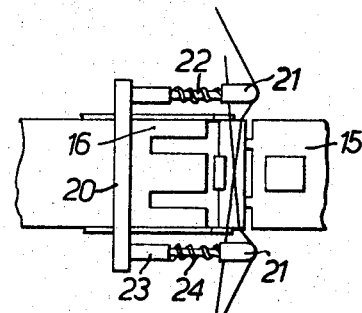
Figure 9A:
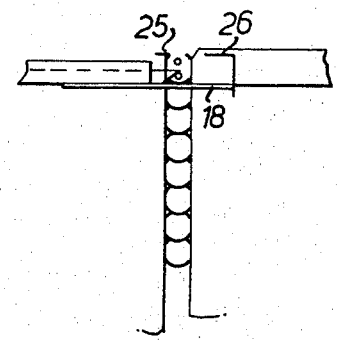
Figure 10:
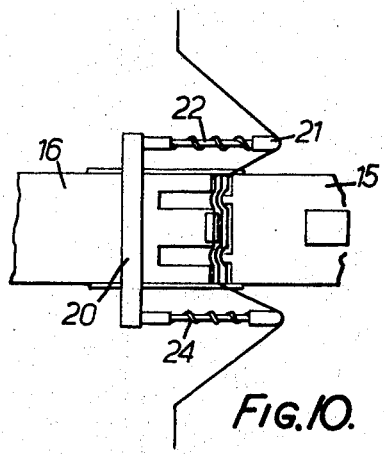
Figure 10A:
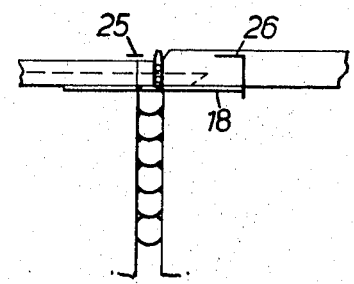
Figure 11:
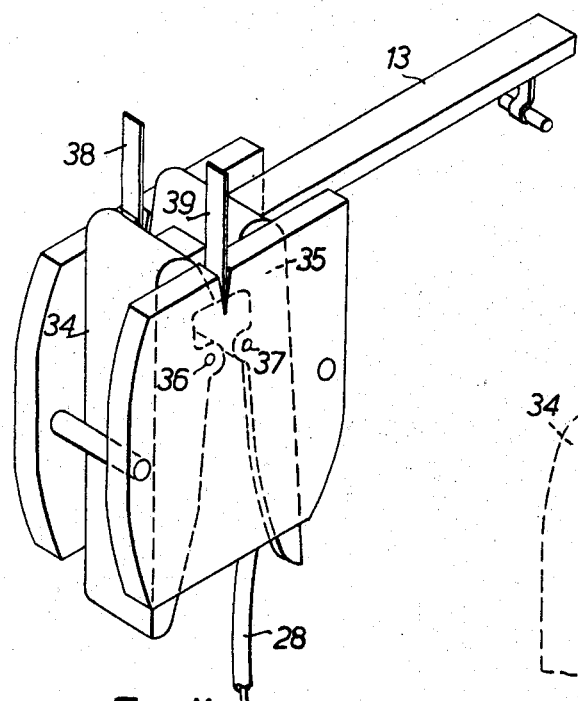
Figure 12:
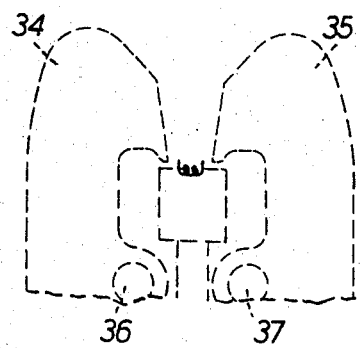
Figure 13:
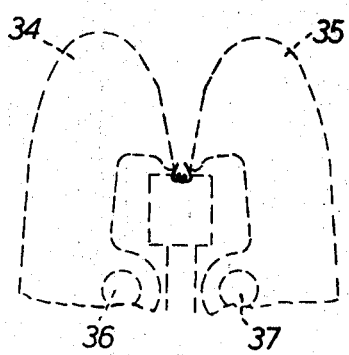
Figure 14:
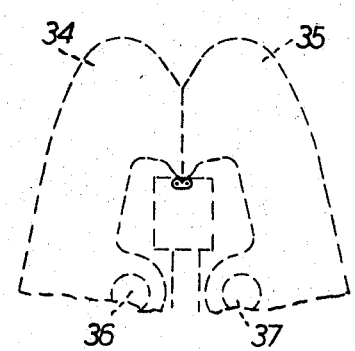
Figure 11A:
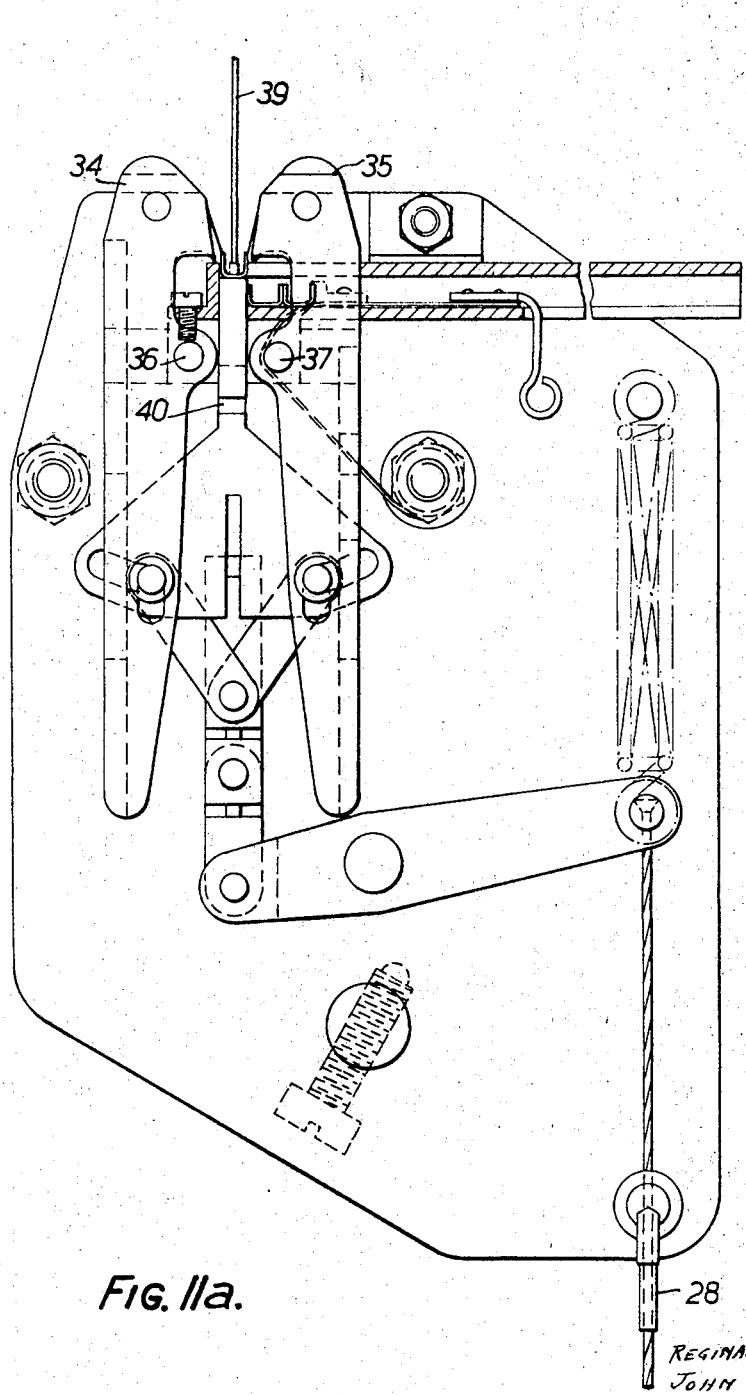

FIGS. 8, 9 and 10 are schematic plan views of the head of the first machine in initial, intermediate and final positions respectively of the crimping action, FIGS. 8a, 9a and 10a are schematic vertical sections through the first machine, corresponding to FIGS. 8, 9 and 10 respectively, FIG. 11 is a perspective view of a second machine, FIG. 11a is a vertical section through a second machine, FIGS. 12, 13 and 14 show the stages of crimping of the second form of clip by a second machine, and FIG. 15 is a vertical section through a part of a third machine.

FIGS. 1–6 show three forms of crimping clips for use in connecting together insulated wires. The first form, shown uncrimped in FIG. 1, comprises a trough-shaped metal section 1, which may be of medium or hard brass or phosphor bronze, the internal surface of the trough being provided with a plurality of metallic spikes 2 formed by piercing the clip from the outside to produce the jagged internal tangs. Additionally, the metal clip is backed with an insulating cover 3.

Figure 3:
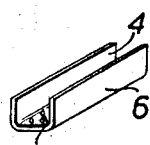
FIG. 3 is a perspective view of an uncrimped second form of clip.

A second form of clip is shown in FIG. 3 and comprises a trough-shaped metal section 4, the base of which is pierced to provide a series of upwardly projecting metal tangs 5. Again the clip is backed with an insulating cover 6.

Figure 5:
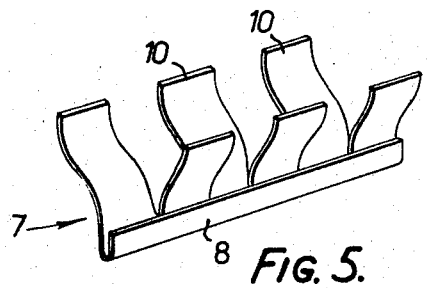
FIG. 5 is a perspective view of an uncrimped third form of clip.
Figure 6:
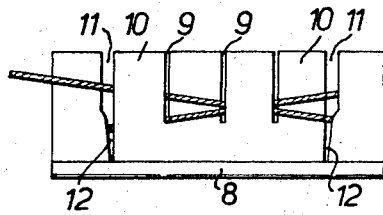
FIG. 6 is a side view of a crimped third form of clip.

The third form of clip is shown in uncrimped form in FIG. 5 and in crimped form in FIG. 6. The metallic body portion 7 which is folded up on itself as shown at 8, contains a series of vertical slots 9 forming a series of teeth portions 10 which are bent alternately to each side of the vertical plane of the body portion. A wider slot 11 is provided between the ultimate and penultimate teeth at both ends of the clip, these slots terminating into cutitng slits at 12.

Figure 1:
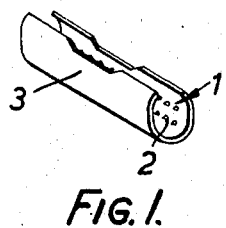
FIG. 1 is a perspective view of an uncrimped first form of clip.
Figure 2:
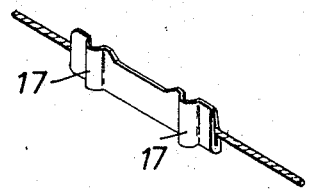
FIG. 2 is a perspective view of a crimped first form of clip.

A foot-operated machine employing the first form of crimping clip is shown in FIGS. 7, 7a and 7b while FIGS. 8–10, which illustrate diagrammatically and in plan the head of the machine, and FIGS. 8a–10a which illustrate diagrammatically and in vertical section the head of the machine, show various stages of the crimping operation in schematic detail. The machine includes a spring-loaded magazine 13 which projects downwards as shown and conveniently serves as a handle for the machine. The magazine contains, suitably, about 30 crimping clips vertically disposed therein one above the other as illustrated diagrammatically in FIGS. 8a–10a. These clips are held together either by an adhesive paper strip or by a light application of adhesive at their join, and are spring-loaded in an upward direction, into an operating position in the head 14 of the machine. Thus a loaded machine, ready for action, contains an uncrimped clip in the opearting position as shown in FIGS. 7b and 8a. The head of the machine includes a stationary die 15 which co-operates with a movable punch 16 to compress a clip in the operating position on actuation of the machine. The shape of the punch and die are chosen to produce a crimped clip as shown in FIG. 2. In addition to the direct closing up of the U-shaped metal section, two indentations 17 are provided. The effect of this arrangement is to lock the limbs against opening and to preserve the residual pressure necessary for the maintenance of a good electrical connection with any wires held between the two surfaces. The compressive force results from the combination of the tension in the free end of the outwardly convex part of the indentation and the compression in the free end of the outwardly concave part of the indentation on release from the die, the tensile and compressive forces being equalised along the line of bending of the two limbs.

Mounted on the underside of the punch to be movable therewith is a forwardly extending separator blade 18 which serves to break the adhesive seal between a clip in the operating position and the clip below before crimping of the clip.

Mounted on and at either side of the punch, again to be movable therewith, are cutting knives 19.

A cross-piece 20 is rigidly attached to span the upper surface of the punch, this cross-piece carrying at each end a spring-loaded tensioning device extending parallel to the direction of motion of the punch and having a notched head 21 attached to a rod 22. This rod is a sliding fit in a housing 23 and is spring-loaded into the normal position shown in FIG. 8 by a spring 24 extending between the housing and the notched head. This provides the wire withdrawal means.

A clip in the operating position is retained in that position against the action of the spring-loaded magazine by restraining projections 25, 26 as shown most clearly in FIG. 8a.

The relative positions and functions of the various components of the machine will be clarified by describing the operation of the machine which is as follows.

After loading the magazine, a first metallic crimping clip is automatically brought to the operating position in the head of the machine where it is held in that position by the restraining projections 25, 26.

Movement of the punch towards the die is controlled by a foot-operated pedal 27 connected to the punch by means of a Bowden cable 28 the arrangement being such that depression of the pedal causes the punch 16 to move towards and against the die 15.

Before depressing the pedal, the first and second insulated wires to be joined are positioned in the clip in a crossed formation shown most clearly in FIG. 7, the positioning of these wires being facilitated by first and second vertical spring separators 29a and 29b located on the head of the machine at each side of the clip.

Each separator defines a first V slot 30 and a second V slot 31, the second slot 31 being deeper than the first as illustrated most clearly in FIG. 7b. The first wire is passed behind the separator 29b to rest in the first V slot 30b of separator 29b and the free end 32 of the first wire is passed through the clip in the operating position, through the deeper V slot 31a of the separator 29a to terminate as shown in FIG. 7. The second wire is passed behind the separator 29a to rest in the first V slot 30a of separator 29a and the free end 33 of the second wire is passed through the clip in the operating position, through the deeper V slot 31b of the separator 29b again to terminate as shown in FIG. 7. Thus the wires are positioned in the crimping clip in crossed formation with the free ends 32 and 33 below the level of the remainder of the wires.

The free end of each wire is held by the operator who then depresses the foot pedal 27 to begin the jointing operation. Initial movement of the pedal moves the punch 16 forwards, and the separating blade 18 parts the loaded clip from the one beneath. The wire withdrawal means are positioned at a level coinciding with that of the base of the first V slots 30, and consequently further movement of the punch causes the notched heads 21 to engage the wires and tension them against the pull of the operator until the fully tensioned position shown in FIG. 9 is reached.

The cutting knives 19 are positioned at both sides of the punch ot a level coinciding with that of the base of the second and deeper slots 31 with the result that slight further movement of the punch from the position shown in FIG. 9 causes the cutting blades to cut off the free ends of the first and second wires, and, with the release of tension due to the cutting of the wires, the wire withdrawal means are allowed to spring forward to their normal positions. In doing so, the ends of the wires are pulled inside the crimping clip 1.

Immediately after cutting and as the ends of the wires are being drawn into the clip, the clip is compressed between the punch and die to produce the crimped joint shown in FIG. 2.

During the crimping operation, the separating blade continues its forward movement and gradually retracts the restraining projection 26 from the normal position shown in FIG. 8a to the position shown in FIG. 10a, with the result that the slight increase in height of the clip which occurs on compression is not obstructed by the projections.

On release of the foot pedal after the crimping operation, the crimped joint may be readily lifted out by its wires and set in position in the cable joint. Simultaneously, on release of the pedal, the parting blade retracts to its original position and, under spring pressure, the sleeves in the magazine are advanced upwards, another taking the place of the crimped one in readiness for the next joint to be made. A lock is incorporated in the machine which requires that a full stroke of the prescribed length must be made before release and the commencement of the next stroke.

A second machine employing the second type of clip is shown in FIGS. 11–14. This machine is provided with a horizontal spring-loaded magazine 13 again conveniently holding 30 clips placed side-by-side as shown in FIG. 11a. A foot-operated Bowden cable 28 is attached to a series of lever arms linked to one another to actuate a pair of beaked jaws 34, 35. These pairs are mounted to pivot about the points 36, 37. A pair of vertical spring separators 38, 39 are positioned as shown between the jaws, one at each side of a clip in the operating position.

Initial depression of the foot pedal causes upward movement of the member 40 which breaks the adhesive joining the clip to the adjacent one and lifts it into the operating position. The wires are then placed in position one on each side of the vertical separators 38, 39 and resting in the base of the trough. Further depression of the pedal communicates motion to the jaws. Cutting blades are attached one to each jaw positioned and arranged to cut off the free ends of each wire prior to the crimping action. Continued movement of the pedal causes the jaws to fold the sides of the trough over the respective wires as shown in FIG. 13 and eventually, against the pressure of the further upward movement of the member 40, to clamp home the edges over the wires as shown in FIG. 14. The wires remain horizontal and in the same plane and are individually crimped by each side of the sleeve as shown.

The leverage available from the foot pedal in this machine increases as the jaws close so that the maximum force is available at the end of the crimping action with a moderate pressure on the pedal.

Figure 4:
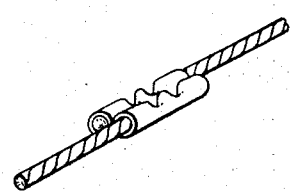
FIG. 4 is a perspective view of a crimped second form of clip.

On release of the foot pedal the crimped joint is lifted out and the next sleeve takes its place, the final joint being as shown in FIG. 4.

An embodiment of the machine, having a modified form of beaked jaws, is illustrated in FIG. 15. The jaws 41, 42 are shaped so that the required forces are applied to the clip at the required positions during the crimping operation. On initiating the crimping operation, the jaws 41, 42 close to the position shown in FIG. 15, and the member 40 moves upwards such that the curved inner faces of the jaws bend the arms of the clip over the wires in the clip. The jaws and the top of the member 40 are shaped to adapt to the form of crimping clip used and to produce the deformation required to make contact with the wires and provide the necessary amount of stored energy. Consequently continued upward movement of the member 40 against the jaws 41, 42 compresses the clip about the wires, the final movement of the member 40 completing the compression of the clip between that member and the beaked undersides of the jaws.

A third form of crimping sleeve is shown in FIG. 5. In this form the unwanted ends of the wires are cut off inside the sleeve, so avoiding the risk of bared ends of wire protruding outside the external insulation. The sleeve may be formed from 0.030 inch thick hard-brass or Phosphor-bronze flat strip, bent to shape as shown, and a number are mounted end to end along a strip of insulating material. In operation, the wires are laid in the sleeve as shown in FIG. 6 which is then closed between flat jaws. The wires are gripped and the unwanted ends cut off by the cutting edges at 12. The wires are trapped between the teeth of the "comb" and are locally shorn of insulation; the wires being deformed and cleaned, make good electrical contact at these points. For a 0.020 inch diameter conductor, the slots 9 are 0.013 inch wide and therefore bite into the conductor: the lower sections 12 of the slots 11 cut off the unwanted wire and the upper section 11 (0.03 inch wide) act as supports for the wire against bending at the slots 9 where it is weakened.

Any reasonable relaxation of the teeth after crimping is not prejudicial to the electrical contact since it is tangential to the conductor: the stored energy and elastic pressure in the line of the crimp are therefore undiminished and a good permanent contact is ensured. The wire, too, which is elongated by the crimping action, is also under elastic stress.

A machine similar to that described first, but with a plane-surfaced punch and die and a separator adapted to deal with the crimping sleeves fed horizontally, will be suitable for this type of sleeve.

We claim:
1. A crimping device of the type adapted to utilise workpieces of open U-type cross-section, having a first and second side, to form an electrical connection between two wires, the device having
   a supporting member to support one of said U-type workpieces,
   a pair of relatively movable jaw members, one of said jaw members movable to cause compression of the first side only of the clip about the first wire to make electrical contact therewith, and the second of said jaw members movable to cause compression of the second side only of the clip about the second wire to make electrical contact therewith, and
   wire severing means arranged to cut off the free ends of the wires,
   whereby said first and second wires are interconnected by said U-type workpieces.

2. A crimping device of the type adapated to utilise workpieces of open U-type cross-section, having a first and second side, to form an electrical connection between two wires, the device having
   a supporting member to support one of said U-type workpieces,
   a pair of relatively movable jaw members movable between a first, open, position, and a second, closed, position, said jaw members in said first, open, position forming an access route for said first and second wires to said workpiece between said jaw members, and said jaw members in said second closed position closing said access route,
   means to move said jaw members between said first, open, position and said, closed, second position,
   means to move said supporting member and said jaw members in said second closed position towards one another, to effect compression of said one side of said workpiece about said one wire by one of said jaw members only, and compression of said second side of said workpiece about said second wire by the other of said jaw members only, and
   wire severing means arranged to cut off the free ends of the wires,
   whereby said first and second wires are interconnected by said workpiece.

3. In the crimping device of claim 1 the provision of wire-withdrawal means arranged to pull said first and second wires and position the cut ends of said wires within the workpiece prior to compression of the workpiece.

4. In the crimping device of claim 2 the provision of wire-withdrawal means arranged to pull said first and second wires and position the cut ends of said wires within the workpiece prior to compression of the workpiece.

5. The crimping device of claim 3 wherein said wire-withdrawal means are adapted and arranged to apply tension to the first and second wires prior to the cutting off of the free ends of the wires, the subsequent cutting off of the free ends of the wires resulting in the cut ends of the wires being pulled into the workpiece.

6. The crimping device of claim 4 wherein said wire-withdrawal means are adapted and arranged to apply tension to the first and second wires prior to the cutting off of the free ends of the wires, the subsequent cutting off of the free ends of the wires resulting in the cut ends of the wires being pulled into the workpiece.

7. The crimping device of claim 1 wherein there is further provided
two vertically disposed separators, one on each side of the supporting member, arranged to facilitate the placing of said first and second wires within the workpiece supported by said supporting member.

8. The crimping device of claim 2 wherein there is further provided
two vertically disposed separators, one on each side of the supporting member, arranged to facilitate the placing of said first and second wires within the workpiece supported by said supporting member.

9. The crimping device of claim 1 wherein there is further provided
a spring-loaded magazine arranged to contain a plurality of workpieces and provide a continual feed of workpieces to the supporting member,
each workpiece in the magazine being in adhesive relationship with its neighboring workpieces, separating means arranged to separate, prior to the compression of the workpiece, the workpiece supported by the supporting member from the next following workpiece.

10. The crimping device of claim 2 wherein there is further provided
a spring-loaded magazine arranged to contain a plurality of workpieces and provide a continual feed of workpieces to the supporting member,
each workpiece in the magazine being in adhesive relationship with its neighbouring workpieces,
separating means arranged to separate, prior to the compression of the workpiece, the workpiece supported by the supporting member from the next following workpiece.

11. The crimping device of claim 1, wherein there is further provided
workpiece restraining means adapted to hold a workpiece in position on the supporting member, part of the said means being arranged to retract during compression of the workpiece to permit withdrawal of the compressed workpiece.

12. The crimping device of claim 2 wherein there is further provided
workpiece restraining means adapted to hold a workpiece in position on the supporting member, part of the said means being arranged to retract during compression of the workpiece to permit withdrawal of the compressed workpiece.

References Cited

UNITED STATES PATENTS

| | | | |
|---|---|---|---|
| 2,549,838 | 4/1951 | Miller | 29—212 X |
| 2,929,069 | 3/1960 | Christin | 29—212 |
| 2,941,431 | 6/1960 | Christensen et al. | 29—212 |
| 3,254,398 | 6/1966 | Macondray et al. | 29—212 |
| 3,328,871 | 7/1967 | Over | 29—203 |
| 3,328,872 | 7/1967 | Reem et al. | 29—203 |
| 3,426,355 | 2/1969 | Over | 29—203 |
| 3,429,431 | 2/1969 | Macondray et al | 29—212 |
| 3,431,621 | 3/1969 | Gurley et al. | 29—203 |
| 3,443,299 | 5/1969 | Brown | 29—203 |

THOMAS H. EAGER, Primary Examiner

U.S. Cl. XR.

29—212